(12) United States Patent
Abnous et al.

(10) Patent No.: US 8,266,084 B2
(45) Date of Patent: *Sep. 11, 2012

(54) SMART CONTAINERS

(75) Inventors: Razmik Abnous, Danville, CA (US);
Eric Merhoff, Walnut Creek, CA (US);
Victor Spivak, San Mateo, CA (US);
Kristy Moore, Pleasanton, CA (US);
Don Robertson, Pleasanton, CA (US);
Howard I-Hui Shao, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/025,032

(22) Filed: Feb. 10, 2011

(65) Prior Publication Data
US 2011/0131251 A1 Jun. 2, 2011

Related U.S. Application Data

(63) Continuation of application No. 12/378,412, filed on Feb. 12, 2009, now Pat. No. 7,912,799, which is a continuation of application No. 11/393,216, filed on Mar. 30, 2006, now Pat. No. 7,512,578.

(51) Int. Cl.
*G06N 5/00* (2006.01)
(52) U.S. Cl. ......................................................... 706/45
(58) Field of Classification Search ..................... 706/45
See application file for complete search history.

(56) References Cited

U.S. PATENT DOCUMENTS 7,512,578 B2 * 3/2009 Abnous et al. .................. 706/47
7,912,799 B2 * 3/2011 Abnous et al. .................. 706/45

* cited by examiner

*Primary Examiner* — Michael B Holmes
(74) *Attorney, Agent, or Firm* — Van Pelt, Yi & James LLP

(57) ABSTRACT

Smart containers are disclosed. A definition is received of a logical structure configured to manage associated content. A policy or operation specified by the definition is applied to an item of content associated with an instance of the logical structure.

20 Claims, 10 Drawing Sheets

SMART CONTAINERS

CROSS REFERENCE TO OTHER APPLICATIONS

This application is a continuation of co-pending U.S. patent application Ser. No. 12/378,412 entitled SMART CONTAINERS filed, Feb. 12, 2009, which is incorporated herein by reference for all purposes; which is a continuation of U.S. patent application Ser. No. 11/393,216, now U.S. Pat. No. 7,512,578, entitled SMART CONTAINERS filed, Mar. 30, 2006, which is incorporated herein by reference for all purposes.

BACKGROUND OF THE INVENTION

Content is often thought about as being composed of multiple components that are related in some way—for example, a project can include business planning documents, marketing and product requirement documents, specifications, engineering schedules, cost estimates, etc.; a loan file typically includes an application, supporting documentation such as credit reports and financial statements provided by the applicant, appraisal documents, etc.; and an email may include one or more attachments. It is often desired to interact with or process these multiple components in a defined way, in a defined order, and by defined people. These interactions or processes are typically defined in software application code. This makes it difficult for individual businesses or people who are not programmers to create or modify their interactions or processes with the content components. It would be beneficial to provide a way to define interactions or processes that act on content and its multiple components that does not require creation or modification of application code.

BRIEF DESCRIPTION OF THE DRAWINGS

Various embodiments of the invention are disclosed in the following detailed description and the accompanying drawings.

DETAILED DESCRIPTION

Figure 1:
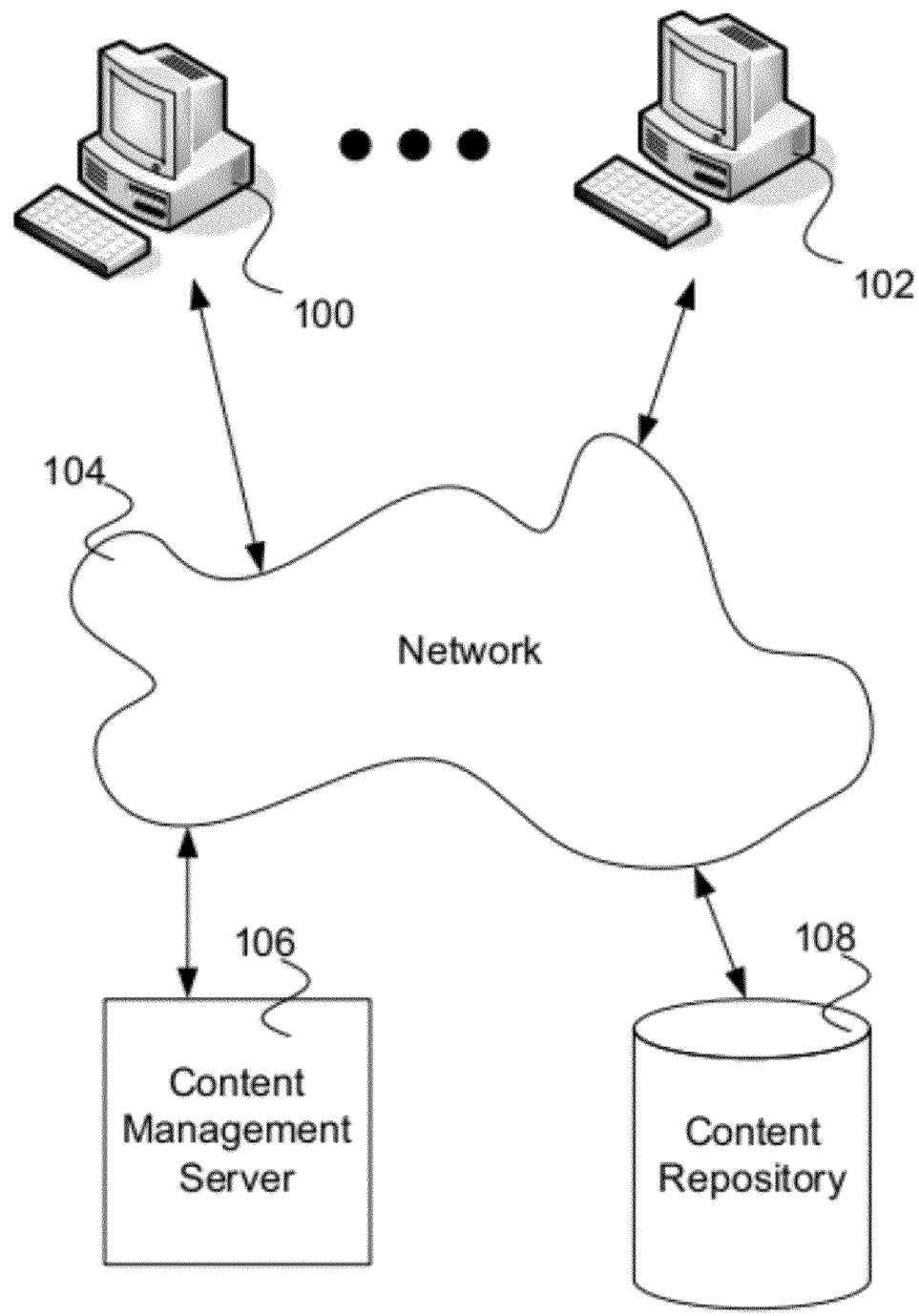
FIG. 1 is a block diagram illustrating an embodiment of a content management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling related content to be created, managed, processed, and used in a desired way, without writing or modifying application code, is disclosed. In one embodiment, a "smart container" template represents a model that defines one or more of the following: how items, such as items of managed content, become "members" of a composite object of a type with which the template is associated; how items comprising the composite object are related to one another; zero or more policies applicable to all or a defined subset of the items comprising the composite object; data indicating how data comprising the composite object is to be viewed or displayed, e.g., depending on context data such as the identity, role, etc. of a user to whom the content is being displayed; and zero or more operations to be performed with respect to content comprising the composite object. A smart container is instantiated using the smart container template. In some embodiments, the smart container is instantiated as a runtime object that implements the membership rules, structural relationships, policies, presentation rules, and operations, as and when applicable, defined by the template. For example, in some embodiments a defined policy is applied. In various embodiments, the policy is applied to managed content associated with the smart container or requested to be associated with the smart container. In some embodiments, smart containers define in a flexible manner objects, a structure for the objects, and policies associated with the objects and the relationships between the objects. In some embodiments, a smart container has a composite object such as a manual for an airplane that includes a corresponding specification for each of the following: the engines, the navigation system, the control systems, the fuel system, etc. In some embodiments, smart containers provide the ability to configure a composite object as a folder hierarchy. For example, a smart container can be used to implement a records management file plan in which a cabinet/folder/object hierarchy where the top-level is a cabinet containing a number of folders, the folders contain files, and the files contain records. In some embodiments, smart containers provide the ability to configure a composite object as a virtual document structure including the following features: 1) ordered members, 2) hierarchical structure independent of folder location, 3) version binding rules, 4) and the ability to save snapshots of the composite object. For example, a smart container can be used to implement a loan file including in the composite object: loan application, customer information (e.g., credit history, status of customer's services), and the circumstances behind the request (e.g., property loss, home purchase). The smart container also enables rules or policies to help during the processing of the loan—for example, a home loan application cannot be considered for approval unless customer income information and home appraisal information are present in the smart container. In some embodiments, smart containers provide the ability to configure a composite object that is completely or partly defined through custom relationships: A composite object can include not only hierarchical structures but also structures represented by associated objects—for example, if document "X" exists, documents "Y", and "Z" must also be included in the composite object. In the case of a finished goods specification smart container, the smart container includes a bill of materials with multiple objects where each of the multiple objects is required to have a corresponding itemized components/raw materials object that indicates the makeup of each of the objects in the bill of materials. In some embodiments, a smart container provides the ability to specify typing for objects and associations within the structure—for example, a smart container provides the ability to prevent the wrong type of document from being placed in a particular location within the structure. Specifically, in an insurance claim file "bodily injury" documents are not allowed to be filed in the "property damage" sub-folder. In some embodiments, the smart container is configured to automatically place an object in an appropriate place in the smart container structure, e.g., based on data comprising and/or metadata associated with the object. In some embodiments, the smart container includes placeholder objects and/or data intended to be replaced at runtime, e.g., in an appropriate point of the lifecycle of the smart container and/or one or more objects associated with it, with another object.

FIG. 1 is a block diagram illustrating an embodiment of a content management system. In the example shown, a computer or terminal, such as one of those represented in FIG. 1 by the computers 100 and 102, is used to interact with a content management system. In some embodiments, the content management system is configured to enable related content to be managed by defining a smart container and associating the related content with the smart container. Computers 100 and 102 are coupled to network 104 and interact via network 104 with content management server 106 and content repository 108 comprising the content management system. In various embodiments, network 104 includes one or more of the Internet, a local area network, a wide area network, a wired network, a wireless network, and any other network that can enable a user to access stored system content. Content management server 106 includes applications that are used when accessing content stored in repository 108 or includes mechanisms to interact with or process content associated with smart containers. Content management server 106 also includes applications used for creating, maintaining, and operating a smart container. A smart container allows for structuring or defining the relationships between content objects in a defined manner as well as associating user roles when interacting with the content and policies to the content objects including policies related to viewing, retaining, operating on, storing, security, versioning, and/or behavior. In some embodiments, content management server 106 and content repository 108 comprise a content management system. In various embodiments, content management server 106 comprises one or more processors, one or more memories, and one or more storage devices and can be implemented using one or more physical box units. In various embodiments, content repository 108 comprises one or more storage devices and/or one or more processors or one or more memories and can be implemented using one or more physical box units. In some embodiments, content management server 106 and content repository 108 are combined in one physical unit or system.

Figure 2:
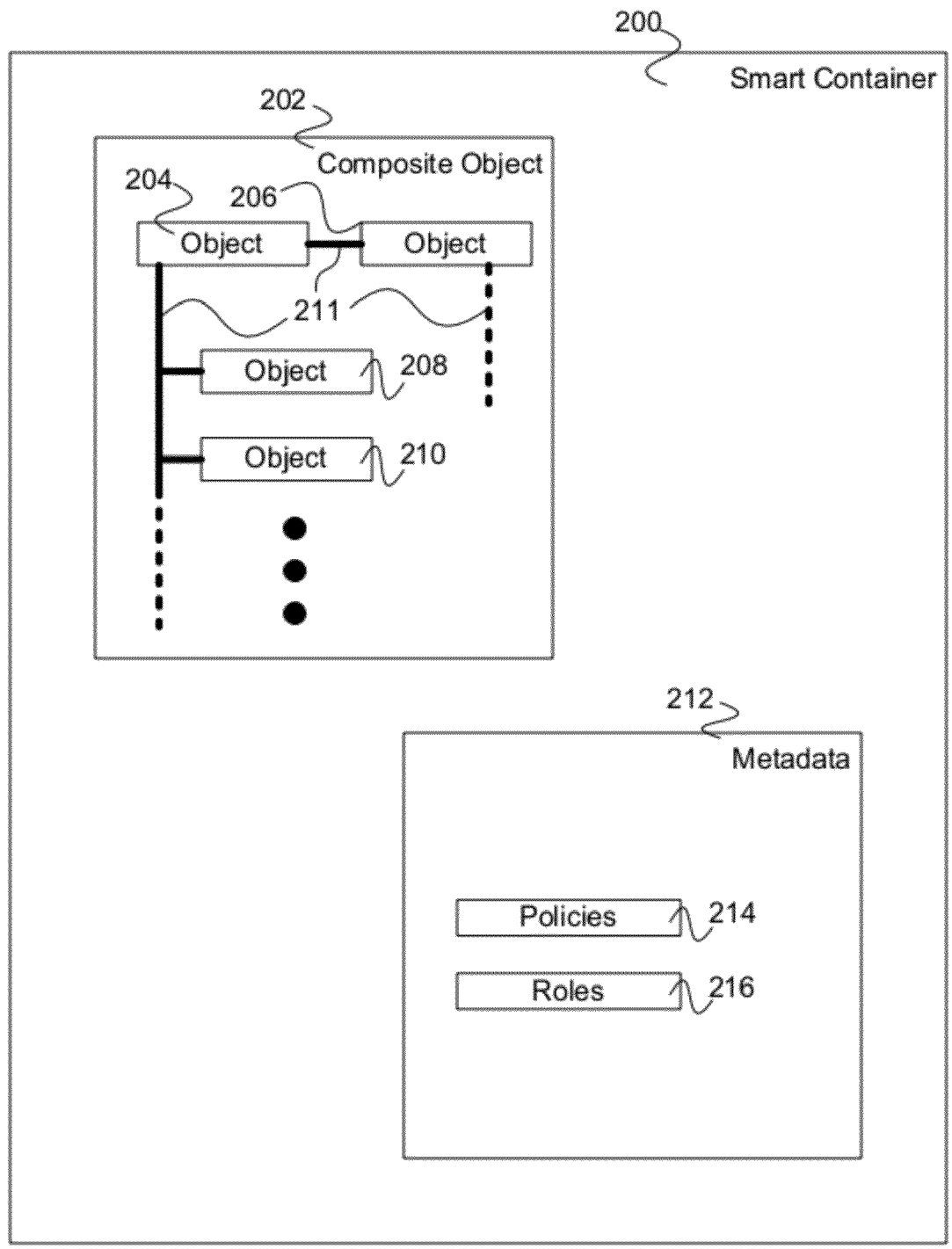
FIG. 2 is a block diagram illustrating an embodiment of a smart container.

FIG. 2 is a block diagram illustrating an embodiment of a smart container. In the example shown, smart container 200 includes composite object 202 and metadata 212. Composite object 202 includes a plurality of objects represented in FIG. 2 as object 204, 206, 208, and 210; the objects are related in a defined manner as represented in FIG. 2 by links 211. In some embodiments, objects are directories, files, or other content, that have links or relationships such as files within folders, shortcuts to files, files pointed to by other files (for example, an email with an associated attachment), or any other appropriate relation between content objects. Metadata 212 includes information such as policies 214 and roles 216 that are associated with the objects and/or the composite object. Policies 214 include information related to viewing, retaining, operating on, storing, security, versioning, and/or other appropriate behavior. In some embodiments, business logic, work flows, and other processing are implemented by one or more policies and/or are stored separately as methods associated with or called or otherwise invoked or initiated by the smart container based on data comprising or associated with the smart container. Roles 216 includes information related to interactions and/or services that are allowed and not allowed for user when associated with a given role. In some embodiments, the smart container comprises an instance of a logical structure the attributes and methods of which are defined at least in part by a template or other definition, such as a model, configuration file, or Java or other software object class. In some embodiment, the objects comprising composite object 202, their relationship to each other, and the policies and other rules and operations to be applied to them are determined and/or implemented at least in part by attributes and/or methods of the instance of the logical structure.

Figure 3:
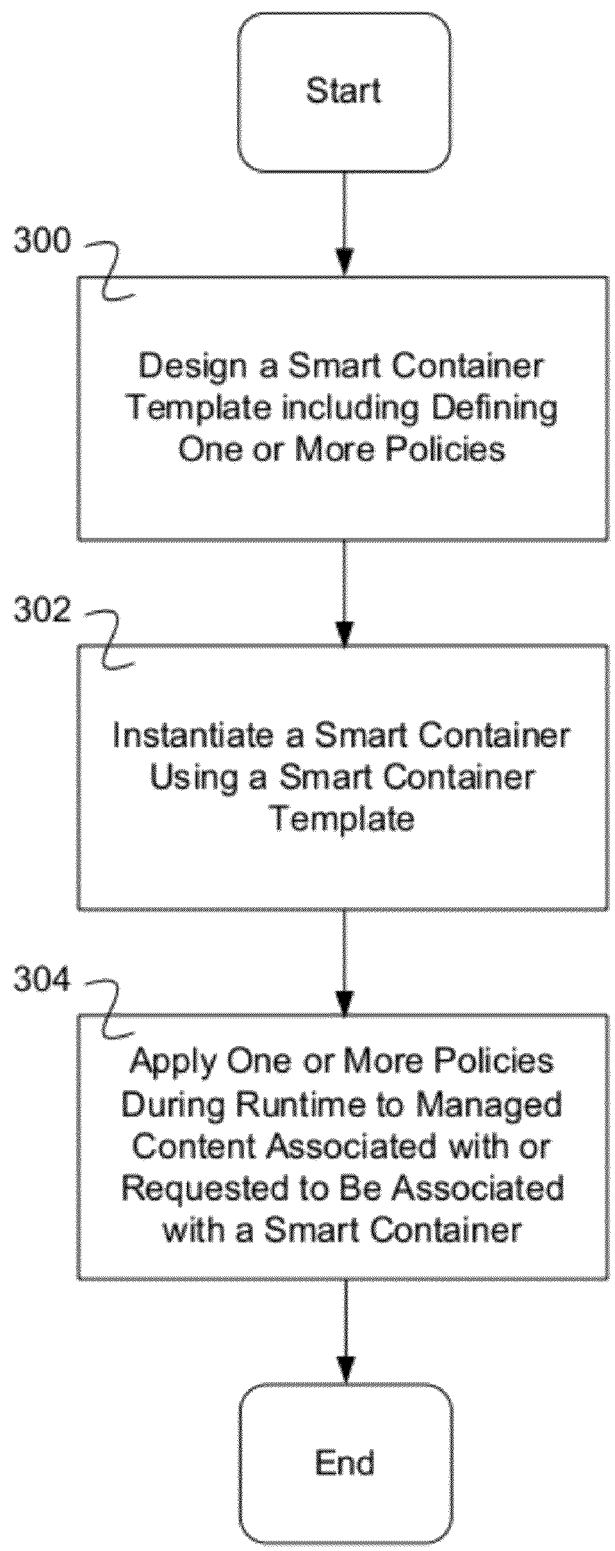
FIG. 3 is a flow diagram illustrating an embodiment of a process for enabling a smart container.

FIG. 3 is a flow diagram illustrating an embodiment of a process for enabling a smart container. In some embodiments, the process of FIG. 3 is executed on a content management server such as content management server 106 of FIG. 1. In the example shown, in 300 a smart container template is designed including defining one or more policies. A smart container template allows for the design of smart containers by providing a model of a smart container that is perhaps close to the user desired smart container. In some embodiments, a user interface, such as an API, GUI, configuration file, or other interface, is provided to enable a non-programmer to define for a type of smart container rules for membership; the structure of the container, including the relationship between members; whether and if so what placeholder objects will initially be included in nodes within the smart container structure at instantiation; default/initial values for smart container attributes, as applicable; roles and associated privileges; policies to be enforced; and business or other processes, work flows, or other operations to be performed or initiated by instances of the smart container. In 302, a smart container is instantiated using a smart container template. In some embodiments, a service running on content management server 106 of FIG. 1 responds to a user or other (e.g., implicit) indication that a smart container instance is required or desired by using template data to create and populate with initial attribute values and/or placeholder data or objects an instance of the smart container. In 304, one or more policies are applied during runtime to managed content associated with or requested to be associated with a smart container.

Figure 4:
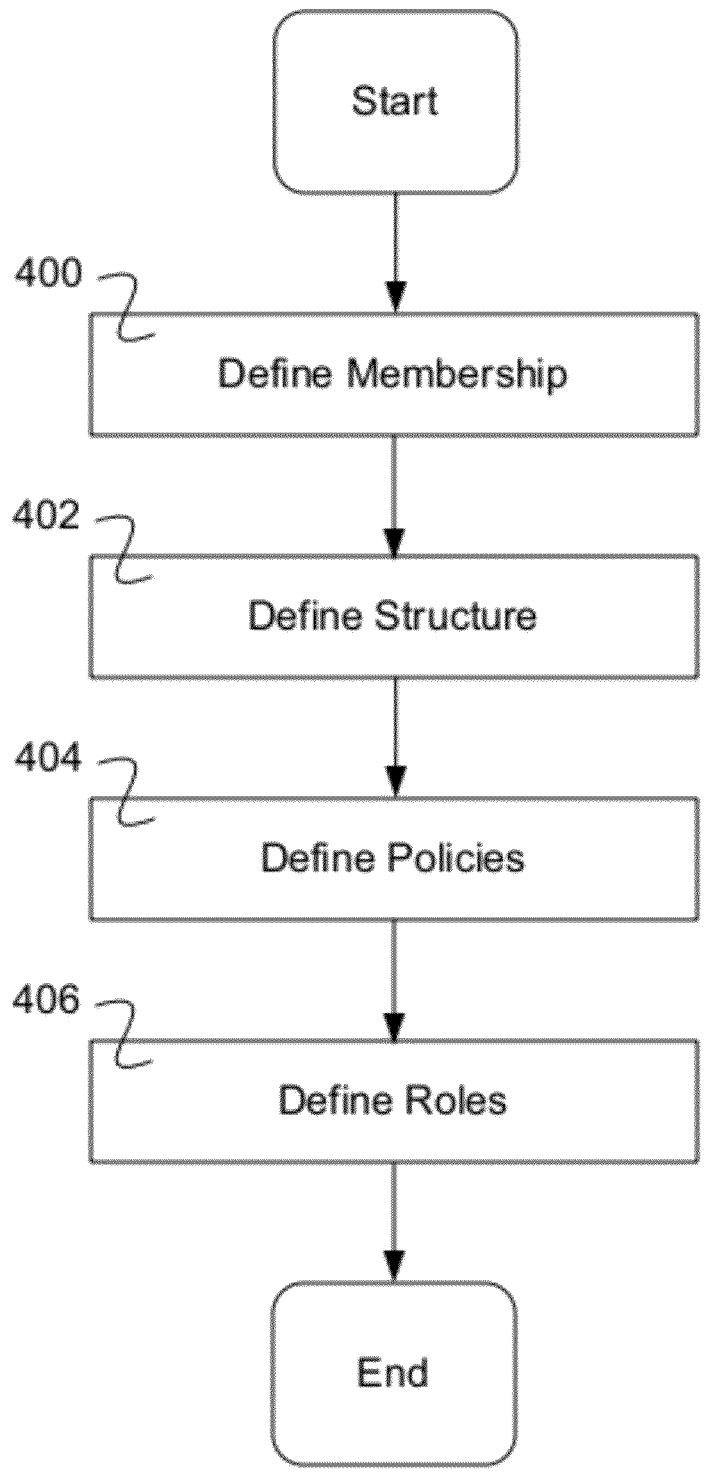
FIG. 4 is a flow diagram illustrating an embodiment of a process for designing a smart container template.

FIG. 4 is a flow diagram illustrating an embodiment of a process for designing a smart container template. In some embodiments, 300 of FIG. 3 is implemented by FIG. 4. In some embodiments, smart container models are saved as templates from which smart containers can be instantiated for run time. A smart container template may be created from scratch, an existing template or existing smart container instance. Upon saving a template configuration, a user interface provides a user options for organization of the template, overwriting existing templates, or saving as new. At the time of template creation, the user has the ability to specify if and how template changes will impact existing smart container instances based on the template as well as any child templates that were also based on the template. For example, the system can be configured, on a template by template basis, to propagate template changes to existing instances and/or child templates, propagate changes only if runtime instance policies match those of the source template (e.g., policies were not changed at instantiation or runtime), propagate changes regardless, or to not propagate changes. In some embodiments, a smart container template extends a given template, a parent template, in order to reuse common configurations. For example, a lending institution may create a Mortgage Loan File Smart Container Template, which contains the basic structure and policies required to gather and process documents for loan processing. However, different states may impose slightly different regulations. So a business analyst would like to create a California specific Mortgage Loan File template which extends the general template. In the example shown in FIG. 4, in 400 membership is defined for a smart container template. In 402, structure is defined for a smart container template. In 404, policies are defined for a smart container template. In 406, roles are defined for a smart container template. In some embodiments, one or more privileges are defined for each role.

Figure 5:
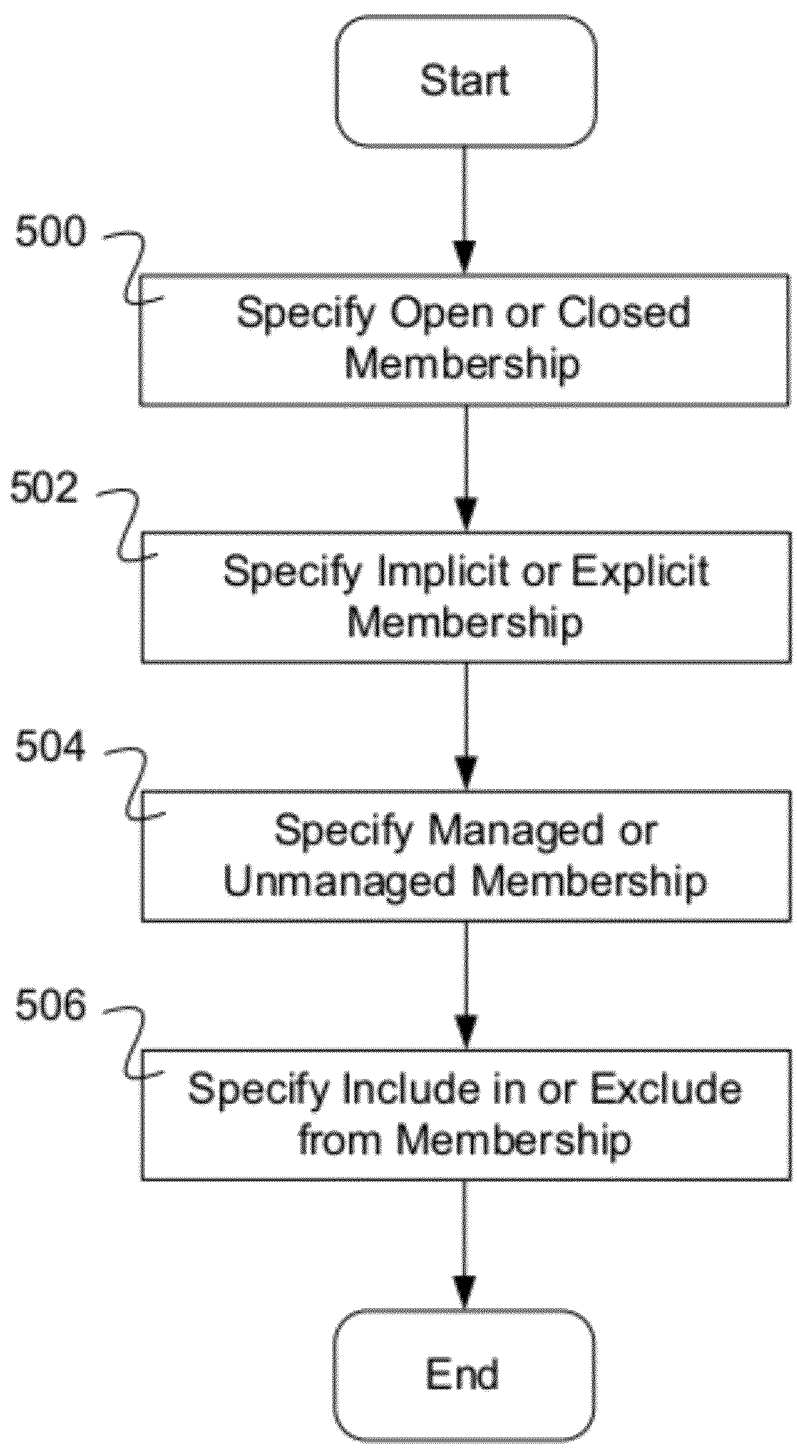
FIG. 5 is a flow diagram illustrating an embodiment of a process for defining membership.

FIG. 5 is a flow diagram illustrating an embodiment of a process for defining membership. In some embodiments, 400 of FIG. 4 is implemented by FIG. 5. In the example shown, in 500 open or closed membership is specified. Open membership allows modification during runtime—for example, objects can be added during runtime. Closed membership does not allow modification during runtime—for example, a folder cannot be added to the smart container, or a document object not included originally in the composite object in the smart container cannot be added. An object can be a smart container (e.g., smart containers can be nested within each other), a folder, a category, a document, a query, a relationships, a placeholder object intended to be replaced by a corresponding instance-specific object at runtime, etc. In 502, implicit or explicit membership is specified. Examples of explicit membership include folder containment, relationship (e.g., a finished goods specification for a product may reference individual components of material that are required to produce the specified product. For example, the individual components of material to package perfume may be bottle, cap, box, and label. These components of material may be represented as individual objects that are associated through a 'relationship' to one or more smart containers. It is by 'relationship' that the component is a member of a smart container), taxonomy (e.g., a taxonomy describes a hierarchical organization of a domain of knowledge—for example, a pharmaceutical taxonomy may organize information about different types of diseases and the drugs used to treat them as follows: a 'Pharma' smart container is organized in a structure represented as a folder structure with 'Pharma' containing a subfolder 'Diseases and Disorders,' which in turn contains a subfolder 'Blood Disorders,' which in turn contains a subfolder 'Anemia,' which in turn contains subfolders: 'Aplastic Anemia,' Dyserythropoietic Anemia,' Hemolytic Anemia,' Megloblastic Anemia,' etc; the taxonomy structure gives folders membership in a taxonomy-based smart container), or category association (e.g., category association is related to taxonomies; and objects containing content and meta-data that match the concepts represented by folders in a taxonomy will be granted membership to those folders; in the taxonomy example above, if a document contains evidence that it is pertinent to aplastic anemia, then the document will become a member of the 'Pharma' smart container and linked to the 'Aplastic Anemia' sub-folder through category association.). An example of implicit membership is becoming a member by virtue of being returned in a query associated with or comprising the smart container. In some embodiments, each of the remaining steps may be applied/defined differently for the various nodes or objects of the smart container. In 504, managed or unmanaged membership is specified. Managed members are governed by the policies associated with the smart container. Unmanaged members are included within the structure of the smart container but are not governed by the smart container's associated policies. In some embodiments, an implicit member (i.e. that of a query results), cannot be managed. In 506, include in membership or exclude from membership rules are defined. A specific object can be defined such that it must be a member of the smart container (e.g., a loan application smart container must include a completed application form) or such that it cannot be a member (in which case an attempt to make an excluded object or an object of an excluded type a member will be rejected.

Figure 6:
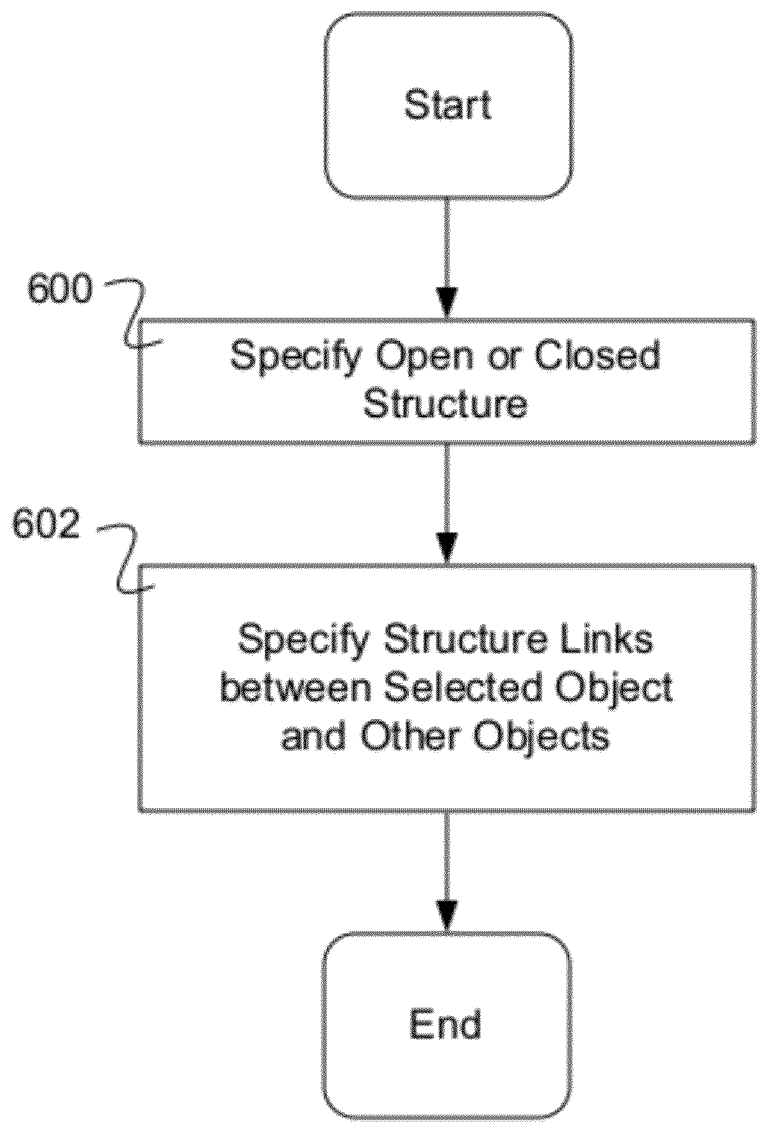
FIG. 6 is a flow diagram illustrating an embodiment of a process for defining structure.

FIG. 6 is a flow diagram illustrating an embodiment of a process for defining structure. In some embodiments, process 402 of FIG. 4 is implemented by FIG. 6. In the example shown, in 600 open or closed structure is specified. An open structure allows modification during runtime—for example, objects can be added during runtime. A closed structure does not allow modification during runtime—for example, a folder cannot be added to the smart container, or a document object not included originally in the composite object in the smart container cannot be added. In various embodiments, structure include one or more of the following as means to relate the individual objects that make up a compound object: 1) folder containment, 2) virtual documents, 3) relationships, 4) taxonomies, 5) categories (e.g. auto-categorization populates a specified attribute that indicates an objects category), and 6) query results. Smart containers may leverage any of these in order to best represent the logical business object. Structure in compound objects should describe important attributes, hierarchy, relationship, and version binding. In some embodiments, version binding describes which version of a document should be referenced. The binding options can be specified with the following options: 1) symbolic version label, such as "Approved", or "Current", etc. 2) explicit version label such as "1.0" or "1.1", etc. 3) early binding meaning associate the document of the specified version at design time, and/or 4) late binding meaning associate the document of the specified version at runtime. In 602, structure links between an object and other objects are specified. For example, one object is a root folder and other objects are folders or documents within the root folder or other folders. In some embodiments, 602 may be applied/defined differently for the various nodes or objects of the smart container.

Figure 7:
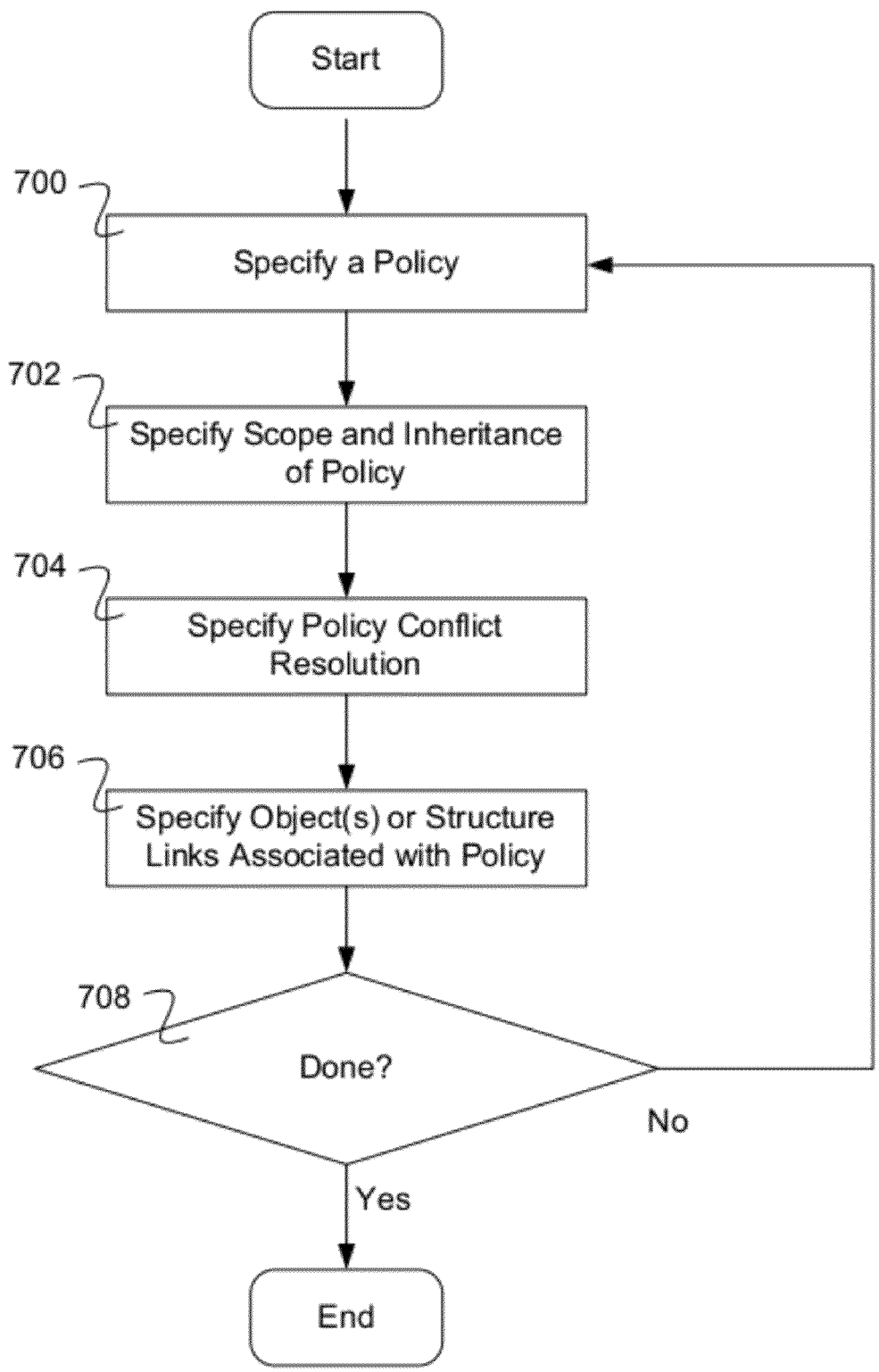
FIG. 7 is a flow diagram illustrating an embodiment of a process for defining policies.

FIG. 7 is a flow diagram illustrating an embodiment of a process for defining policies. In some embodiments, process 404 of FIG. 4 is implemented by FIG. 7. In various embodiments, a policy comprises a retention policy that is associated with a root folder or other folder, check-in rules for member documents (for example, do not allow same version on check-in), auto-naming rules for smart container and member objects (for example, object names are assigned when created, when there is a lifecycle state change, etc.), role based privilege policy, rule for when placeholder should be replaced, policy for placement of an incoming member object within a runtime structure, workflows (e.g., a workflow defines the activities and flow of a business process, for example a loan application workflow would automate the flow of a loan file through the loan approval process.), specific to smart container or member objects, lifecycles for smart container or member objects (e.g., a document typically moves through different stages in which it may have different meta-data values, security, folder location, etc., and these stages can be modeled and automated with a lifecycle—one example of a lifecycle is the typical draft, review, approve stages of a document), content storage policy, distributed content configuration policy, content caching policy, full text indexing policy, etc. In 700, a policy is specified. In 702, the scope and inheritance of the policy is specified. The scope of a policy determines to which objects of a smart container a policy will be applied when it is evoked at instantiation or runtime. When a policy is associated to an object which may contain children (e.g. a folder or object with relationships to 'child' objects), the user can specify if the given policy is to be inherited, how deep the inheritance applies, and whether or not the policy can be overridden or narrowed (further constrained) by policies associated to children objects. In 704, the policy conflict resolution is specified. It is possible, if not likely, that a smart container or its contents has associated policies that conflict. For this reason a mechanism for conflict resolution is specified. A "static resolution' mechanism may be invoked to resolve the conflict at time of association. A 'dynamic resolution' mechanism may be invoked to resolve the conflict at time of instantiation and runtime (i.e., when a given policy is applied or evoked). The appropriate mechanism depends on the given policy and association. In 706, object(s) or structure links associated with policy are defined. In some embodiments, 706 is the first step in the flow—for example, an object class is defined; policies are associated with the object class; and policy inheritance and conflict resolution are defined. In 708, it is determined if the process is done. If not, then control passes to 700, otherwise the process ends.

Figure 8:
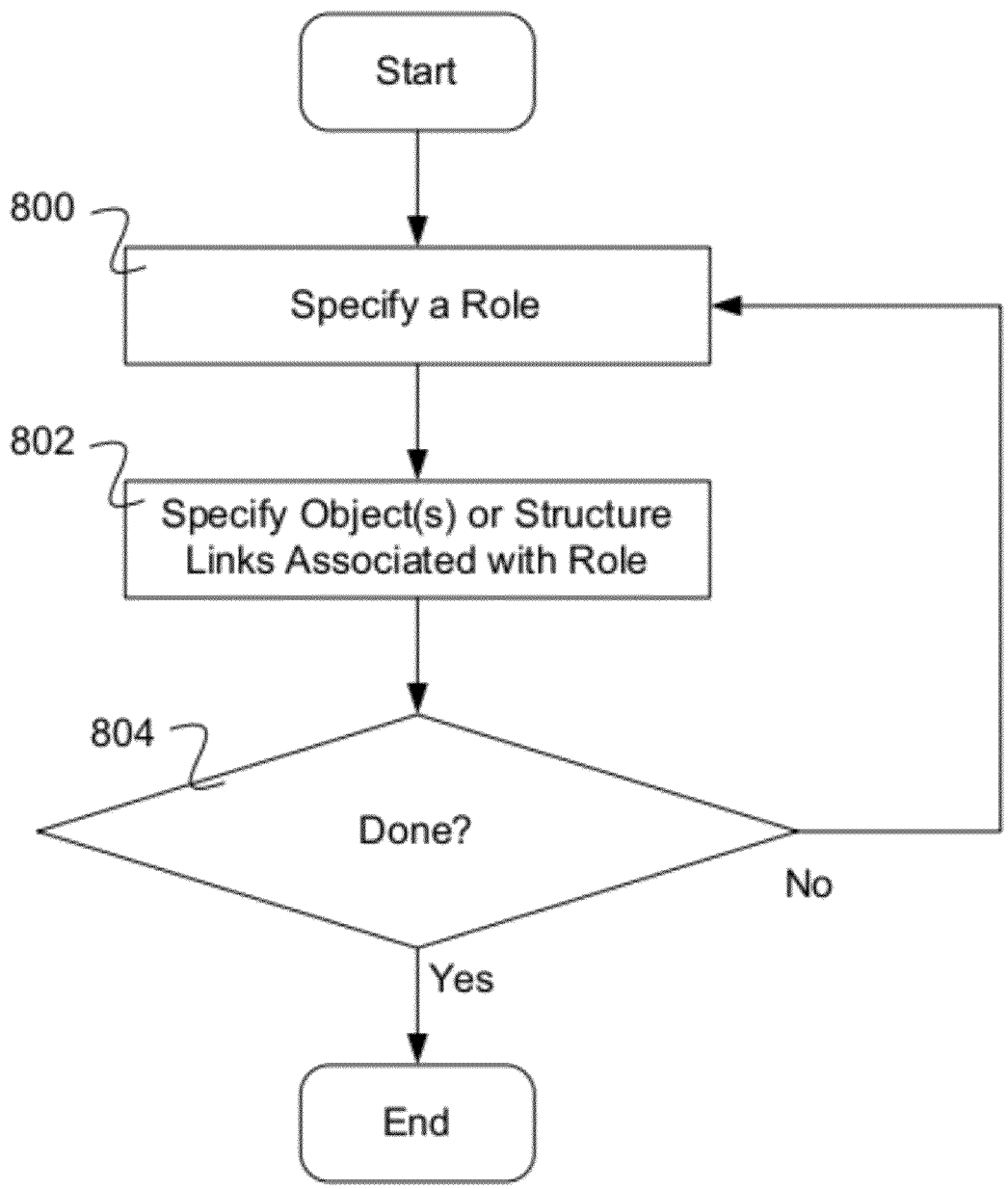
FIG. 8 is a flow diagram illustrating an embodiment of a process for defining roles.

FIG. 8 is a flow diagram illustrating an embodiment of a process for defining roles. A role can be assigned a set of users and a set of entities and services that users in that role can access. In some embodiments, process 406 of FIG. 4 is implemented by FIG. 8. In 800, a role is specified. For example, in the case of a loan processing two of the roles included are an account executive and a loan closing specialist. The account executive is responsible for processing a specific aspect of a loan application such as reviewing and validating incoming documents and recommending whether to deny the loan or send it on for further consideration. The loan closing specialist is responsible for the final review of all documents, insuring compliance with legal and regulatory requirements, funding the loan, and promoting the loan file to the "closed" state. There is a 'Fund Loan' workflow defined that automates the process of funding a loan. The ability to start this workflow should be available to the loan closing specialist but not to the account executive. In addition, the Fund Loan workflow should only be available when a loan file is selected and not when some other object of the smart container is selected. In 802, object(s) or structure links associated with role are specified. Zero or more roles can be applied to an Object in a smart container in order to constrain the domain of users that can operate on instances of that Object and to define the services and entities that are accessible to each user within the context of that object. In 804, it is determined if the process is done. If not, then control is passed to 800, otherwise the process ends. In some embodiments, an object class is defined and then roles are associated with the object class. In some embodiments, the process flow is 1) define a role including its members and services and entities available to users of that role, and 2) associate role to object class.

Figure 9:
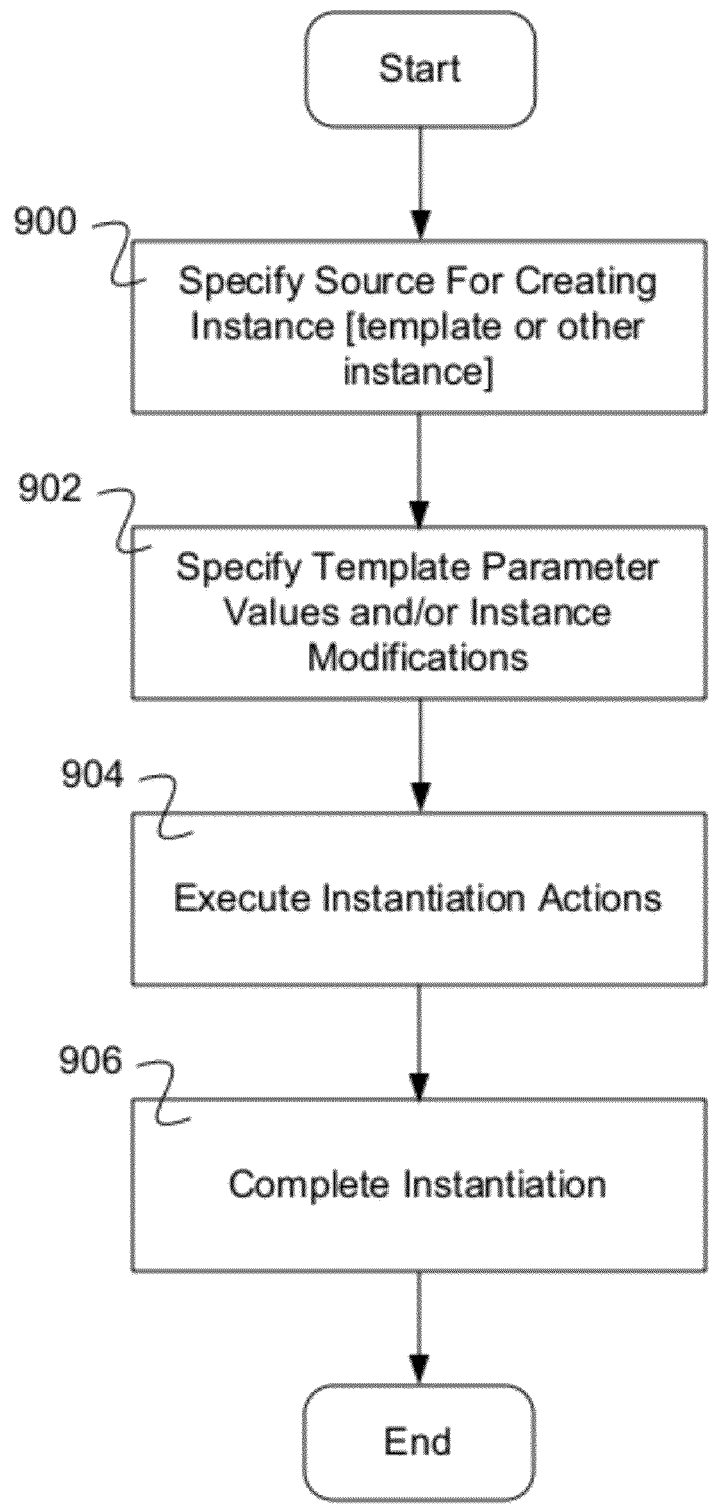
FIG. 9 is a flow diagram illustrating an embodiment of a process for instantiating a smart container using a smart container template or other instance as a source.

FIG. 9 is a flow diagram illustrating an embodiment of a process for instantiating a smart container using a smart container template or other instance as a source. In some embodiments, process 302 of FIG. 3 is implemented using the process of FIG. 9. In the example shown, in 900 the source for creating an instance is specified. In various embodiments, a new smart container can be created from a saved smart container template, or from another runtime instance. In 902, template parameter values and other instantiation-time modifications for the instance are specified. Template parameters are initial values (e.g., content, metadata, or policies) that change from instance to instance and are required in order to create a new instance. For example, when creating a room smart container from a template, the user may need to select the initial members; when creating a loan file smart container from a template, the loan processor may need to specify an originating document, i.e. loan application; or when creating a finished goods specification smart container, the user may need to enter the name and description of the end product. A Smart Container cannot be successfully created until values have been supplied for all required parameters. In some embodiments, auto-generated forms will be used to prompt users for parameter values. In 904, instantiation actions are executed. Instantiation may result in one or more of the following actions: object creation, replacing placeholders with actual objects, policy evaluation and execution including actions such as the following: attachment of lifecycles, starting workflows, sending notifications, auto-attribution, access control list assignment, custom security assignment, retention policy assignment, other custom-defined actions. In some embodiments, at instantiation, the smart container template provides a default configuration. If permissions and policies allow, these defaults can be overridden for the new instance. In some embodiments, the instance is saved as a new template. In some embodiments, if defaults have been overridden during instantiation or if changes have been made for the instance that was started using a template, users will have the option to save these changes to the source template or to save them to a new template. In 906, instantiation is completed. Instantiation is complete after all instantiation actions and policies have successfully run, and the instance model has been flagged as a "runtime" model. In some embodiments, all instantiation related actions are logged.

Figure 10:
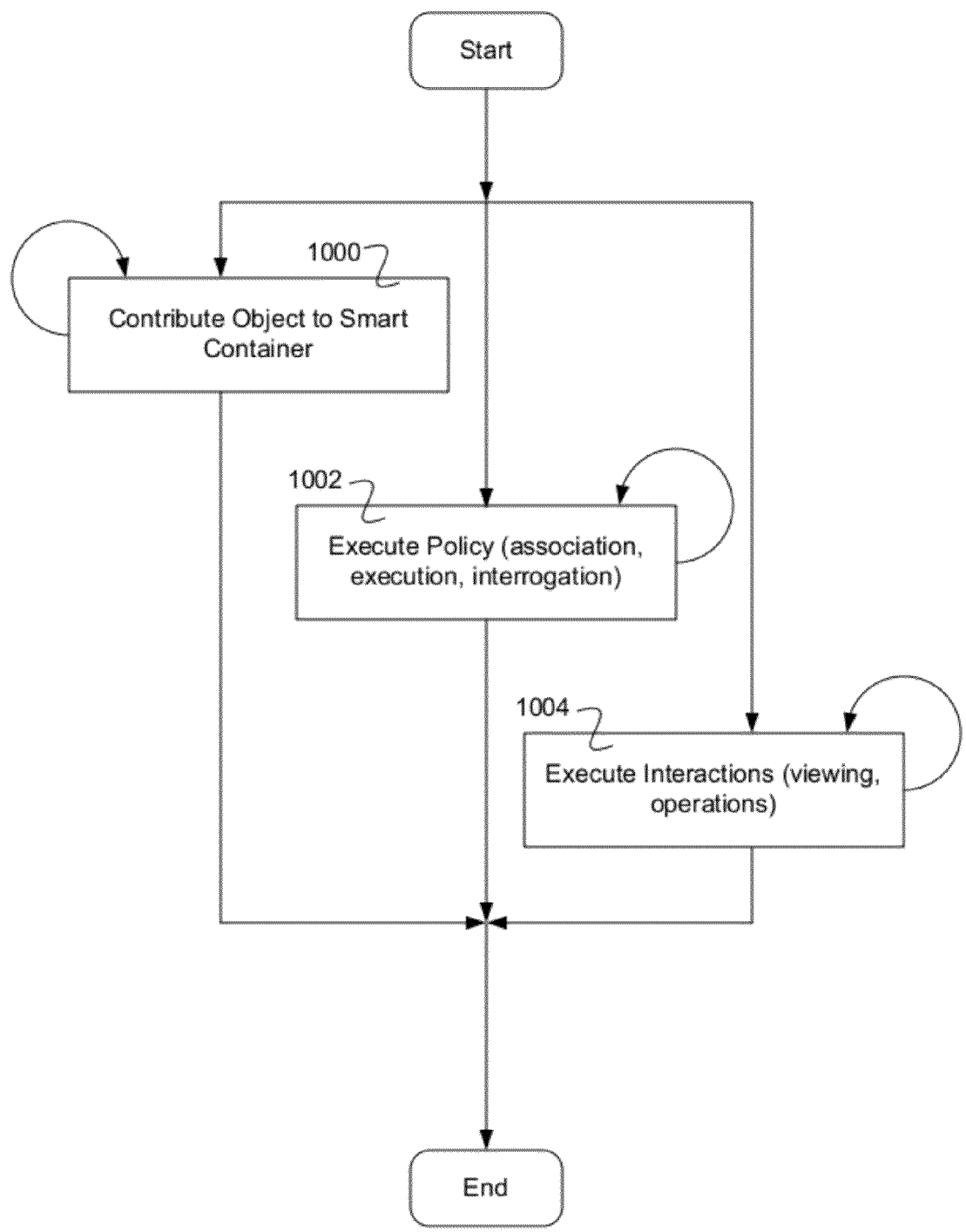
FIG. 10 is a flow diagram illustrating an embodiment of a process for applying a smart container policy during runtime.

FIG. 10 is a flow diagram illustrating an embodiment of a process for applying a smart container policy during runtime. In 1000, an object is contributed to a smart container. Contribution to a Smart Container may happen through user interactions or through automated processes. Objects may be contributed one by one or through high ingestion operations. In various embodiments, users may explicitly link objects into a folder that is part of the smart container instance; an object may be auto-categorized, based on its content and/or attribute values to a folder that is part of the smart container instance; an object may be associated with a root-level smart container object that has a policy which further-categorizes the object and places the document in the appropriate spot within the smart container structure; or an object may be created as a member of a smart container during instantiation—the nodes of the model become members of the smart container at runtime.

In 1002, a policy is executed. A policy is a discrete bit of business logic that is defined to execute based on some event or object operation. It may be implemented as an aspect attached to an object, such as by modifying an instance of an implementation object to add to that instance one or more methods or attributes not included in every object of that type; as a type-based behavior implemented by modifying or extending a base implementation object to include additional type-based behaviors; or script. In some embodiments, out-of-the-box smart containers will include several common policies and will provide a framework for creating other policies. All users and programmatic manipulation of an object in the managed content system will honor the policies that have been applied to that object. Smart container configuration associates policies explicitly—for example, a policy is associated directly with the object configuration or object class; a policy is associated with a relation type and the object is referenced by a relationship of that type; or a policy is inherited by the object from a parent object. A policy could have been associated with an object in a number of ways in addition to those associated explicitly through smart container configuration—for example, a policy is associated with the user object, role, or group; a policy associated with an object type; a policy is associated with the document template that a document was created from; a policy related to format; or a policy that is programmatically applied to an object or is user selected. A policy has a number of elements including a trigger which defines when a policy executes, a declarative or code-based set of conditions that will be evaluated at execution time to true or false, and an outcome (e.g., positive, negative, and error). A policy can manage conflicts. In the case where multiple policies may be associated with an object either directly or through inheritance, the system detects that there is a policy conflict (e.g., an object has multiple policies of the same type—for example two security or two versioning policies). The appropriate conflict resolution technique is applied including include 1) one policy takes precedence and only that policy is applied, 2) policies are applied sequentially, or 3) an error is indicated because the conflict cannot be resolved.

In 1004, interactions are executed. At runtime, users and programs interact with a smart container and its contents. Interactions include viewing and operating on objects controlled by the smart container configuration. Viewing will display information regarding a smart container object in a manner as indicated by the viewing policy. For example, email is viewed in a split window display with one window containing in box, out box, and junk box folders, another window listing the recent inbox emails, and another window showing the contents of a particular email. Views can be different dependent on the object, the user, the role of the user, the security policy, or any other appropriate criteria. In various embodiments, operations for smart containers include one or more of the following: fill a placeholder with an actual document object; attach a policy to an object; remove a policy from an object; add a document to an smart container; remove a document from an smart container; freeze smart container; version smart container; lock/unlock smart container; export smart container; copy smart container; check-out/check-in smart container; cancel smart container checkout; replicate smart container; and/or make smart container reference. Also, objects governed by a smart container may be operated on in any of the usual ways, i.e. copying, moving, versioning, saving, get file, set file, set attribute, get attribute, lifecycle operations, attach to workflow, creation, deletion, etc. However, because the object is governed by a smart container configuration, these operations may be restricted, modified, overridden, or extended in some way by the policies on the object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing content comprising:
   receiving a definition of a logical structure configured to manage associated content for a content management system;
   providing, using a processor, an indication that the policy or operation specified by the definition has been applied to the item of content associated with the instance of the logical structure, wherein the item of content is stored in a memory.

2. A method as in claim 1, further comprising creating the instance of the logical structure.

3. A method as in claim 1, further comprising creating the instance of the logical structure using a template.

4. A method as in claim 1, further comprising creating the instance of the logical structure using a template wherein the template is configure to propagate changes to the template by one of the following: to propagate template changes to the instance, to propagate template changes in the event that instance policies match original template policies, to propagate change in the event that instance policies do not match original template policies, and to not propagate changes.

5. A method as recited in claim 1, wherein the policy or operation specified by the definition is applied to the item of content at least in part by a method of the instance.

6. A method as in claim 1, wherein the instance is configured based at least in part on the definition to apply the policy or operation.

7. A method as in claim 1, further comprising receiving an indication that the item of content has become or is desired to be associated with a logical structure.

8. A method as in claim 5, wherein said policy or operation is applied to the item of content at least in part in response to said indication.

9. A method as in claim 1, wherein the instance of the logical structure and the item of content comprise a composite object.

10. A method as in claim 7, wherein the item of content comprises one of a plurality of items of content comprising the composite object.

11. A method as in claim 1, wherein the item of content comprises a first item of content, the first item of content and a second item of content are associated with the instance of the logical structure, and the logical structure specifies a relationship between the first and second items of content.

12. A method as in claim 1, wherein the policy comprises one or more of the following: a retention policy, a security policy, a viewing policy, a versioning policy, a full text indexing policy, and a role-based policy.

13. A method as in claim 1, wherein the definition defines one or more of the following: a membership rule; a structure of the logical structure; a role associated with the logical structure; and a role-based or other privilege with respect to the logical structure or one or more associated objects.

14. A method as in claim 1, further comprising defining a parameter value for the instance of the logical structure.

15. A method as in claim 1, further comprising modifying a default parameter value in the instance of the logical structure.

16. A method as in claim 1, further comprising saving the instance as a new definition.

17. A method as in claim 1, wherein the definition comprises one or more of the following: a template, a model, and a class.

18. A computer program product for managing content, the computer program product being embodied in a computer readable medium and comprising computer instructions for:

receiving a definition of a logical structure configured to manage associated content for a content management system;

providing an indication that the policy or operation specified by the definition has been applied to the item of content associated with the instance of the logical structure.

19. A computer program product as in claim 18, wherein the policy comprises a retention policy.

20. A computer program product as in claim 18, wherein the policy comprises a role-based policy.

* * * * *